United States Patent [19]  [11] 4,315,040
Heine et al.  [45] Feb. 9, 1982

[54] PARTING OIL COMPONENT FOR BAKED GOODS AND PARTING OILS

[75] Inventors: Christian Heine, Monheim; Uwe Ploog, Haan; Reinhold Wüst, Kaarst bei Neuss, all of Fed. Rep. of Germany

[73] Assignee: Henkel Kommanditgesellschaft auf Aktien (Henkel KGaA), Dusseldorf-Holthausen, Fed. Rep. of Germany

[21] Appl. No.: 92,229

[22] Filed: Nov. 7, 1979

[30] Foreign Application Priority Data

Nov. 25, 1978 [DE] Fed. Rep. of Germany ....... 2851104

[51] Int. Cl.$^3$ ............................................. A23D 5/00
[52] U.S. Cl. .................................. 426/609; 426/611; 260/410.9 N
[58] Field of Search ............................. 426/609, 611; 260/410.9 R, 410.9 N

[56] References Cited

U.S. PATENT DOCUMENTS

| 1,328,556 | 1/1920 | Bloch | 426/609 |
| 1,944,887 | 1/1934 | Graves | 260/410.9 N |
| 2,042,221 | 5/1936 | Groll et al. | 260/410.9 N |
| 2,371,284 | 3/1945 | Cook et al. | 260/410.9 R X |
| 2,559,481 | 7/1951 | Truesdell | 426/609 |
| 2,963,372 | 12/1960 | Brody et al. | 426/609 |
| 4,023,912 | 5/1977 | Mahler et al. | 426/609 X |
| 4,112,235 | 9/1978 | Schmerling | 260/410.9 N X |

Primary Examiner—Robert A. Yoncoskie
Attorney, Agent, or Firm—Hammond & Littell, Weissenberger and Muserlian

[57] ABSTRACT

A component for parting oils or releasing agents for baked goods that can be used as substitute for natural, hardened sperm whale oil in parting oils for baked goods, comprising a synthetic wax ester of:

(a) a mixture of $C_{12}$–$C_{20}$-fatty acids having an iodine number of 48–96 and a content of $C_{16}$–$C_{18}$-fatty acids of at least 90%; with (b) a mixture of $C_{12}$–$C_{20}$-fatty alcohols having an iodine number of 50–95 and a content of $C_{16}$–$C_{18}$-fatty alcohols of at least 90%, said synthetic wax ester having an iodine number of 40–110; a saponification number of about 110; an acid number of less than 1; an hydroxyl number of 5 or less; and a solidification range of from 10°–30° C. The parting oils for baked goods contain from 20% to 60% by weight of the above wax ester and from 80% to 40% by weight of edible liquid triglycerides of natural fatty acids with a polyene content as low as possible.

9 Claims, No Drawings

PARTING OIL COMPONENT FOR BAKED GOODS AND PARTING OILS

BACKGROUND OF THE INVENTION

The present invention relates to a component for parting oils or releasing agents for baked goods that is physiologically safe, mets food regulations and can be used in place of natural, hardened sperm whale oil in parting oils for baked goods.

Parting oils or releasing agents are employed in baking to coat molds before addition of the dough to be baked therein. Their use aids in the separation (parting) of the baked goods from the molds. Customarily natural, hardened sperm whale oil has been employed as a component of such parting oils. The reduction of the catching quotas for whales however, has led to an increasing scarcity of sperm oil, which is, among others, an important component of parting oils for baked goods.

OBJECTS OF THE INVENTION

An objective of the present invention is the development of a parting oil component for baked goods that is safe with respect to physiology and food regulations and can be used as substitute for natural, hardened sperm oil in parting oils for baked goods because of its physical and technological properties.

Another object of the present invention is the development of a synthetic wax ester useful as a component of parting oils or releasing agents for baked goods consisting of an ester prepared by combining
(a) a mixture of $C_{12}$–$C_{20}$-fatty acids having an iodine number of 48–96 and a content of $C_{16}$–$C_{18}$-fatty acids of at least 90%; with
(b) a mixture of $C_{12}$–$C_{20}$-fatty alcohols having an iodine number of 50–95 and a content of $C_{16}$–$C_{18}$-fatty alcohols of at least 90%,
said synthetic wax ester having an iodine number of 40–110; a saponification number of from 100 to 140; an acid number of less than 1; an hydroxyl number of 5 or less; and a solidification range of from 10°–30° C.

A further object of the present invention is the development of a parting oil or releasing agent for baked goods containing from 20% to 60% by weight of the above wax ester and from 80% to 40% by weight of edible liquid triglycerides of natural fatty acids with a polyene content as low as possible.

These and other objects of the present invention will become more apparent as the description thereof proceeds.

DESCRIPTION OF THE INVENTION

Thus the subject of the invention is a component of a parting oil for baked goods consisting of a synthetic wax ester prepared by combining
(a) a mixture of $C_{12}$–$C_{20}$-fatty acids with an iodine number of 48–96 and a content of $C_{16}$–$C_{18}$-fatty acids of at least 90%, with
(b) a mixture of $C_{12}$–$C_{20}$-fatty alcohols with an iodine number of 50–95 and a content of $C_{16}$–$C_{18}$-fatty alcohols of at least 90%,
said synthetic wax ester having the following chemical or physical properties based on the analytical data:
iodine number: 40–110
saponification number: 100–140, preferably about 110
acid number: about 1 or less
hydroxyl number: about 5 or less
solidification range: 10° to 30° C.

More particularly, the present invention relates to a synthetic wax ester useful as a component of parting oils for baked goods consisting of an ester prepared by combining
(a) a mixture of $C_{12}$–$C_{20}$-fatty acids having an iodine number of 48–96 and a content of $C_{16}$–$C_{18}$-fatty acids of at least 90%; with
(b) a mixture of $C_{12}$–$C_{20}$-fatty alcohols having an iodine number of 50–95 and a content of $C_{16}$–$C_{18}$-fatty alcohols of at least 90%,
said synthetic wax ester having an iodine number of 40–110; a saponification number of from 100 to 140; an acid number of less than 1; an hydroxyl number of 5 or less; and a solidification range of from 10° to 30° C.; as well as a parting oil for baked goods containing from 20% to 60% by weight of the above wax ester and from 80% to 40% by weight of edible liquid triglycerides of natural fatty acids with a content of polyenic fatty acids of less than 16% by weight.

Starting products for the preparation of the wax ester are, for component (a), the fatty acids component, technical grade olefin fractions such as are obtained by saponification and fractionation, if desired, from fatty acids of tallow, palm oil or hardened vegetable oils of suitable composition. The fatty acid mixtures obtained therefrom contain fatty acids with the chain length of $C_{12}$ to $C_{20}$ and a content of fatty acids of the chain length of $C_{16}$ to $C_{18}$ of at least 90% and an iodine number of 48 to 96. The chain length distribution is approximately in the following range:

| Chain length | % |
| --- | --- |
| $C_{12}$ | approx. 1 |
| $C_{14}$ | 2–4 |
| $C_{15}$ | approx. 1 |
| $C_{16}$ | 5–26 |
| $C_{16'}$ | 2–6 |
| $C_{17}$ | approx. 2 |
| $C_{18}$ | 2–17 |
| $C_{18'}$ | 44–70 |
| $C_{18''}$ | 3–10 |
| $C_{18'''}$ | approx. 1 |
| $C_{20'}$ | approx. 1 |

' = mono-olefinic unsaturation
'' = di-olefinic unsaturation
''' = tri-olefinic unsaturation The content of polyene acids should be as low as possible and not exceed a total of 13%.

The chemical or physical properties based on the analytical data of the fatty acid mixture are in the following range:
iodine number: 48–96
saponification number: 200–210
acid number: 198–210
unsaponifiables: approx. 1%
solidification range: 4° to 45° C.

Suitable as the second starting fatty alcohol component (b) are fatty alcohol mixtures as they are obtained by reduction, particularly hydrogenation of fatty acid mixtures derived from animal fats. These fatty alcohol mixtures contain fatty alcohols with the chain length $C_{12}$–$C_{20}$, with a content of at least 90% of fatty alcohols with the chain lengths $C_{16}$–$C_{18}$ and an iodine number of 50–95. The chain length distribution is approx. in the following range:

| Chain length (%) | |
|---|---|
| $C_{12}$ | 1 or less |
| $C_{14}/C_{14'}$ | 0.3–3.6 |
| $C_{15}$ | 0.5 or less |
| $C_{16}$ | 2.5–24.8 |
| $C_{16'}$ | 1.4–3.8 |
| $C_{17}/C_{17'}$ | 2.3 or less |
| $C_{18}$ | 2.1–17.5 |
| $C_{18'}$ | 40.8–80.9 |
| $C_{18''}$ | 0.7–2.7 |
| $C_{18'''}$ | 1–2.5 |
| $C_{20}/C_{20'}$ | 2.2 |

' = mono-olefinic unsaturation
" = di-olefinic unsaturation
''' = tri-olefinic unsaturation Small percentages of chain lengths of less than $C_{12}$ and more than $C_{20}$ may also be present, but should be kept as low as possible since the parting effect is impaired by an excessive amount of alcohols of less than $C_{12}$ on the one hand, and the solubility of the ester in triglycerides is reduced by an excessive amount of alcohols of more than $C_{20}$, on the other hand.

The chemical or physical properties based on the analytical data of the fatty alcohol mixtures are in the following range:
  iodine number: 50–95
  saponification number: <1
  acid number: <0.2
  hydroxyl number: 205–220
  solidification range: 3° to 34° C.

The wax ester is prepared in a well-known manner by esterification of molar amounts of the corresponding fatty acid component (a) with the corresponding fatty alcohol component (b), for example, in the presence of esterification catalysts such as isopropyl titanate. The wax ester can, subsequently to the esterification, be separated from unesterified components, particularly alcohol components, by vacuum distillation and then be freed from acid by extracting with an aqueous alkali metal hydroxide, bleached and deodorized in the usual manner, to obtain a product that is completely neutral with respect to taste. Thanks to the suitable selection of the starting components (a) and (b) for the esterification the wax esters have the following chemical or physical properties based on the analytical data:
  acid number: <1
  saponification number: 100–140, preferably about 110
  hydroxyl number: <5
  iodine number: 40–100, preferably about 70
  solidification range: 10° to 30° C.

Such wax esters possess special advantages for the intended use as sperm oil substitution product for parting oils for baked goods. For example, they have an increased resistance to oxidation due to the adjustment to a relatively low iodine number of about 70 and the low content of fatty acids or fatty alcohols with multiple olefinic bonds. Furthermore, the solidification point is easily adjusted to the seasonal temperature. Other advantages over sperm oil are the possibility of maintaining a uniform quality and the utilization of reasonably priced and plentiful raw materials.

The starting materials as well as the wax esters themselves must have the purity required for use in foods.

For the preparation of a parting oil or releasing agent for baked goods, the wax esters are mixed at a ratio by weight of 20:80 to 60:40, preferably at a ratio of 25:75 to 50:50, with triglycerides of natural edible fatty acids that are liquid at room temperature and have the lowest possible content of polyene acids, particularly less than 16% by weight of the fatty acids in said triglycerides.

Liquid palm oil fractions as well as triglycerides of fatty acids with medium-length chains are particularly suitable for this purpose.

A suitable palm oil fraction possesses the following chemical or physical properties based on the analytical data:
  drop point (°C.): 20–22
  dilatation at 20° C.: about 5% solids content
  saponification number: 195–202
  acid number: $\leq 0.2$
  iodine number: 58–62
  fatty acid composition (%)
    $C_{14}$: 1–1.5
    $C_{16}$: 34–38
    $C_{16'}$: $\leq 0.5$
    $C_{18}$: 4–5
    $C_{18'}$: 39–43
    $C_{18''}$: 12–15
    $C_{20}$: $\leq 1$ Other liquid triglycerides with a low content of polyene fatty acids and solidification points between about $-18°$ and $+24°$ C. are similarly suitable. Examples of these are oleic acid triglycerides or neatsfoot oil.

A suitable medium-chain triglyceride mainly contains fatty acids with the chain lengths $C_8$–$C_{10}$ and has the following chemical or physical properties based on the analytical data:
  setting point (°C.): $-16$
  saponification number: 338
  acid number: $\leq 0.2$
  iodine number: $\leq 0.2$
  viscosity (20° C.): 29.4 c St
Fatty acid composition (%)
  $C_6$: 0.5
  $C_8$: 61.1
  $C_{10}$: 29.5
  $C_{12}$: 1.0

The parting oil or releasing agent for baked goods preferably consists of 20 to 30% by weight, of the wax ester component according to the invention, 20 to 30% by weight of a liquid palm oil fraction or a corresponding triglyceride and 60 to 40% by weight of a medium-chain triglyceride.

As optional additional component, from 0 to 5%, preferably from 3% to 5% by weight of phosphatides, such as lecithin can be added as emulsifying agents to the parting oil for baked goods.

The following examples are illustrative of the practice of the invention without being limitive in any respect.

EXAMPLE 1

A 2 liter three-neck flask equipped with an agitator, thermometer and distillation head was charged with 522 gm of oleyl-cetyl alcohol (OH number 215, iodine number 85) and 544 gm of fatty acid of animal origin (saponification number 205, iodine number 54). The mixture was dehydrated at approximately 100° C. with agitation for about 30 minutes. Then, 1 gm of a 28% solution of isopropyl titanate was added and the mixture was slowly heated to 140°–200° C., over a period of about 10 hours. Excess oleyl-cetyl alcohol was then distilled off at 225° C./2–3 torr and, after raffination with 50% sodium hydroxicde solution, the product was bleached by the addition of 1% activated charcoal and 1% aluminum oxide activated with acid and heating to and maintaining at 100° C. for about 30 min. under water jet vacuum. After filtration, approx. 1 kg of a wax ester with the following chemical or physical properties based on the analytical data was obtained:

| acid number | 0.5 |
|---|---|
| saponification number | 108 |
| iodine number | 71.5 |
| color (determined according to Lovibond in 5¼"-cell | yellow 13 red 2 |
| consistency | at room temperature: liquid oil |
| turbidity point | + 35° |
| setting point | + 27° |

EXAMPLE 2

As described in Example 1, a mixture of 522 gm of oleyl-cetyl alcohol (hydroxyl number 215), iodine number 55) and 544 gm of technical grade oleic acid (saponification number 200, iodine number 92) was esterified, refined and bleached. About 1 kg of a liquid wax ester was obtained, which congeals partially at room temperature and has the following chemical or physical properties based on the analytical data:

| acid number | 0.12 |
|---|---|
| saponification number | 106 |
| iodine number | 76.3 |
| color (determined according to Lovibond in 5 ¼"-cell) | yellow 15 red 2.1 |
| turbidity point | + 16° C. |
| setting point | + 13° C. |

EXAMPLE 3

A parting oil with excellent parting qualities has the following composition:

| wax ester according to Example 2 | 24% by weight |
|---|---|
| palm oil fraction, liquid | 24% by weight |
| medium-chain triglyceride ($C_8$:$CH_{10}$ = 60:30) | 48% by weight |
| soy lecithin | 4% by weight |

The preceding specific embodiments are illustrative of the practice of the invention. It is to be understood however, that other expedients known to those skilled in the art or disclosed herein, may be employed without departing from the spirit of the invention or the scope of the appended claims.

We claim:

1. A synthetic wax ester useful as a component of parting oils for baked goods consisting of an ester prepared by combining
   (a) a mixture of $C_{12}$–$C_{20}$-fatty acids having an iodine number of 48–96 and a content of $C_{16}$–$C_{18}$-fatty acids of at least 90%; with
   (b) a mixture of $C_{12}$–$C_{20}$-fatty alcohols having an iodine number of 50–95 and a content of $C_{16}$–$C_{18}$-fatty alcohols of at least 90%, said synthetic wax ester having an iodine number of 40–110; a saponification number of from 100 to 140; an acid number of less than 1; an hydroxy number of 5 or less; and a solidification range of from 10° to 30° C.

2. The synthetic wax ester of claim 1 wherein said saponification number is about 110.

3. The synthetic wax ester of claim 1 wherein said fatty acid mixture (a) has an iodine number of 48–96, saponification number of 200–210, an acid number of 198–200, about 1% of unsaponifiables, a solidification range of from 4° C. to 45° C. and a content of polyenic fatty acids of less than 13%.

4. The synthetic wax ester of claim 1 wherein said fatty alcohol mixture (b) has an iodine number of 50–95, a saponification number of less than 1, an acid number of less than 0.2, a hydroxyl number of 205–220 and a congealing range of 3° C. to 34° C.

5. A parting oil or releasing agent for baked goods consisting of from 20% to 60% by weight of the synthetic wax ester of claim 1, from 80% to 40% by weight of edible triglycerides of natural fatty acids, liquid at room temperature and with a polyenic fatty acid content of less than 16% by weight of the fatty acids in said triglycerides, and from 0 to 5% by weight of phosphatides.

6. The parting oil or releasing agent for baked goods of claim 5 wherein said edible triglycerides includes a liquid palm oil fraction with the following chemical or physical properties based on analytical data:
   drop point (°C.): 20–22
   dilatation at 20° C.: approx. 5% solids content
   saponification number: 195–202
   acid number: ≦0.2
   iodine number: 58–62
fatty acid composition (%)
   $C_{14}$: 1–1.5
   $C_{16}$: 34–38
   $C_{16}$ monounsaturated: ≦0.5
   $C_{18}$: 4–5
   $C_{18}$ monounsaturated: 39–43
   $C_{18}$ di-unsaturated: 12–15
   $C_{20}$: ≦1.

7. The parting oil or releasing agent for baked goods of claim 5 wherein said edible triglycerides includes a medium-chain triglyceride of $C_8$–$C_{10}$ fatty acids with the following chemical or physical properties based on analytical data:
   setting point (°C.): −16
   saponification number: 338
   acid number: ≦0.2
   iodine number: ≦0.2
   viscosity (20° C.): 29.4 c St
Fatty acid composition (%)
   $C_6$: 0.5
   $C_8$: 61.1
   $C_{10}$: 29.5
   $C_{12}$: 1.0.

8. A parting oil or releasing agent for baked goods consisting of
from 20% to 30% by weight of the synthetic wax ester of claim 1,
from 20% to 30% by weight of a liquid palm oil fraction with the following chemical or physical properties based on analytical data:
   drop point (°C.): 20–22
   dilatation at 20° C.: approx. 5% solids content
   saponification number: 195–202
   acid number: ≦0.2
   iodine number: 58–62
Fatty acid composition (%)
   $C_{14}$: 1–1.5
   $C_{16}$: 34–38
   $C_{16}$ monounsaturated: ≦0.5
   $C_{18}$: 4–5

$C_{18}$ monounsaturated: 39-43
$C_{18}$ di-unsaturated: 12-15
$C_{20} \leqq 1$
from 40% to 60% by weight of a medium-chain triglyceride of $C_8$–$C_{10}$-fatty acids with the following analytical data
setting point (°C.): −16
saponification number: 338
acid number: $\leqq 0.2$
iodine number: $\leqq 0.2$
viscosity (20° C.): 29.4 c St
Fatty acid composition (%)

$C_6$: 0.5
$C_8$: 61.1
$C_{10}$: 29.5
$C_{12}$: 1.0
and from 3% to 5% of lecithin.

9. In the process of releasing baked goods from molds comprising applying a releasing agent to said molds before baking, adding dough to said molds, baking said dough and separating the baked goods from said molds, the improvement consisting of using the releasing agent for baked goods of claim 5, as said releasing agent.

* * * * *